US007255538B2

(12) United States Patent
Shi

(10) Patent No.: US 7,255,538 B2
(45) Date of Patent: Aug. 14, 2007

(54) SHRINK-FIT STRESS COUPLING FOR A SHAFT OF DIFFERING MATERIALS

(75) Inventor: Jun Shi, Glastonbury, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 219 days.

(21) Appl. No.: 11/054,490

(22) Filed: Feb. 9, 2005

(65) Prior Publication Data

US 2006/0177316 A1 Aug. 10, 2006

(51) Int. Cl.
*F03D 11/00* (2006.01)

(52) U.S. Cl. ............................ 416/244 A; 416/244 R; 403/30; 403/29

(58) Field of Classification Search ............ 416/244 R, 416/244 A; 403/28, 29, 30, 273
See application file for complete search history.

(56) References Cited

U.S. PATENT DOCUMENTS 3,943,703 A 3/1976 Kronogard
4,011,737 A 3/1977 Kruger et al.
4,063,850 A 12/1977 Hueber et al.
4,123,199 A 10/1978 Shimizu et al.
4,281,941 A 8/1981 Rottenkolber
4,639,194 A 1/1987 Bell, III et al.
5,161,908 A 11/1992 Yoshida et al.
6,431,781 B1 8/2002 Schenk
2002/0150419 A1 10/2002 Schenk

*Primary Examiner*—Edward K. Look
*Assistant Examiner*—Dwayne J White
(74) *Attorney, Agent, or Firm*—Carlson, Gaskey & Olds

(57) ABSTRACT

A shrink-fit coupling includes a discontinuous ring between a ceramic stub shaft of a turbine rotor and an inner diameter r2 of a metallic shaft which typically supports a compressor rotor. If the materials for the ceramic stub shaft and the discontinuous ring are pre-determined and the radius of the ceramic stub shaft is also given, then the inner radius r2 of the shaft should be chosen by the equation: r2=(CTE1−CTE2)/(CTE3−CTE2) r1.

9 Claims, 2 Drawing Sheets

SHRINK-FIT STRESS COUPLING FOR A SHAFT OF DIFFERING MATERIALS

BACKGROUND OF THE INVENTION

The present invention relates to a coupling, and more particularly to a compressive stress coupling arrangement having a third material between a ceramic component and a metal component.

Turbine inlet temperature strongly influences the thermal efficiency of a gas turbine: higher turbine inlet temperature generally leads to thermally more efficient gas turbines. However, higher turbine inlet temperature requires temperature and oxidation resistant materials such as ceramics. These components include ceramic turbine rotors that are typically attached to a metal shaft such that power is transmitted from the turbine rotor to a compressor rotor.

Connecting the ceramic turbine rotor to the metal shaft requires particular structural arrangements as ceramics thermally expand less than metals. The difference in thermal expansion results in thermal stress that may lessen the connection between the ceramic rotor and the metallic shaft. To maintain an effective joint between the rotor and the shaft, various brazing, shrink-fit compliant intermediate layers as well as mechanical clamp structures have been employed.

Accordingly, it is desirable to provide a shrink fit coupling for coupling a ceramic member to a metal member that is capable of transmitting torque at relatively high temperatures.

SUMMARY OF THE INVENTION

A shrink-fit coupling according to the present invention includes a discontinuous ring between a ceramic stub shaft of a turbine rotor and an inner diameter of a metallic shaft which supports a compressor rotor. The stub shaft defines an outer radius r1 and has a coefficient of thermal expansion (CTE) of CTE1. The discontinuous ring defines an inner radius r1, outer radius r2 and CTE2. The shaft is tubular and defines an inner radius r2 and CTE3. The outer radius of the shaft is preferably selected such that a suitable compressive stress is created when the ceramic stub shaft, the discontinuous ring and the shaft are shrink-fit together preferably at room temperature.

If the materials for the ceramic stub shaft and the discontinuous ring are pre-determined and the radius of the ceramic stub shaft is also given, then the inner radius r2 of the shaft should be chosen by the equation: $r2=(CTE1-CTE2)/(CTE3-CTE2)\,r1$. Numerical results prove that when the inner radius of the metal shaft is chosen according to this equation no change in initial stress state is expected and very low stress change was observed after the temperature rise upwards of 1000 F.

The present invention therefore provides a coupling for coupling a ceramic member to a metal member that is capable of transmitting torque at relatively high temperatures.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
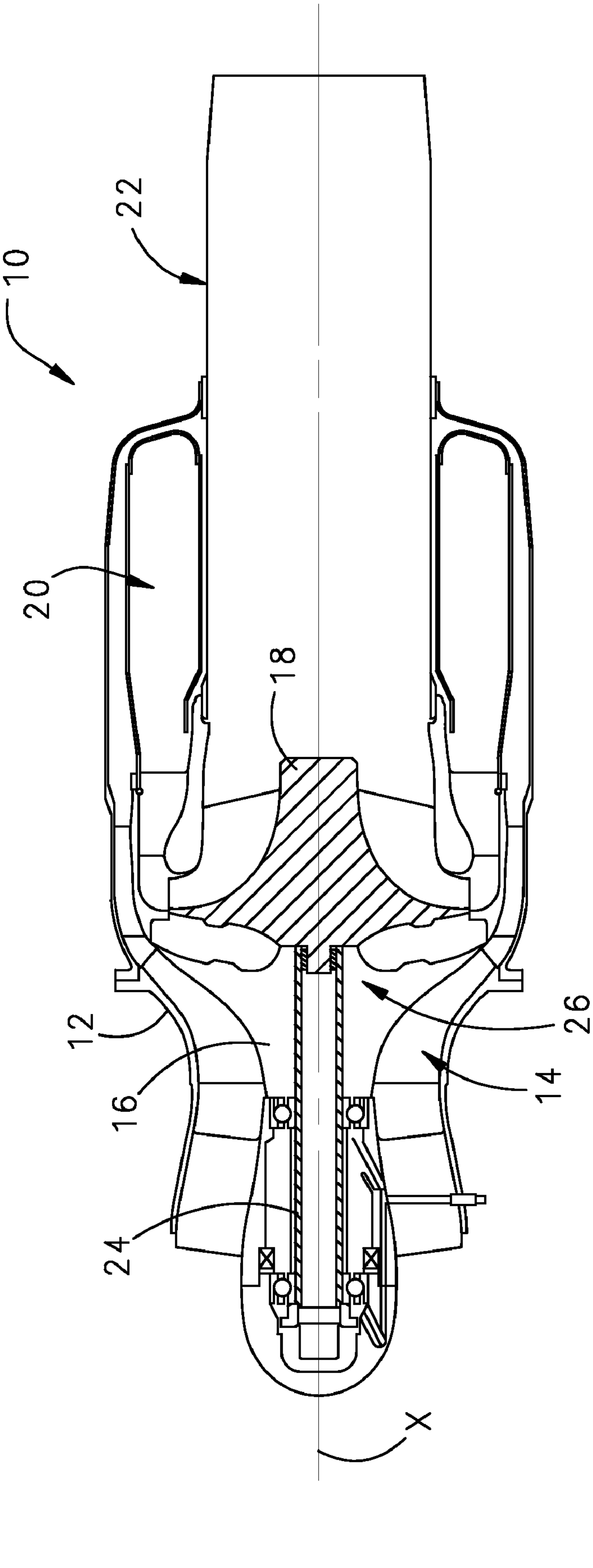
FIG. 1 is a schematic view of a gas turbine engine according to the present invention.

FIG. 1 illustrates a general perspective view of a gas turbine engine 10 (illustrated schematically in simplified form) which generally includes a housing 12, a rotor system 14 which rotates about a longitudinal axis X, a combustion system 20 and an exhaust 22. The rotor system includes a compressor rotor 16 and a turbine rotor 18 mounted to a rotor shaft 24. In the illustrated rotor configuration, the rotor system 14 includes a ceramic turbine rotor 18 mounted to a metallic rotor shaft 24 at a shrink-fit coupling 26. It should be understood that although a gas turbine engine is illustrated in the disclosed embodiment, various shafts coupling segments for various applications will also benefit from the present invention.

Figure 2A:
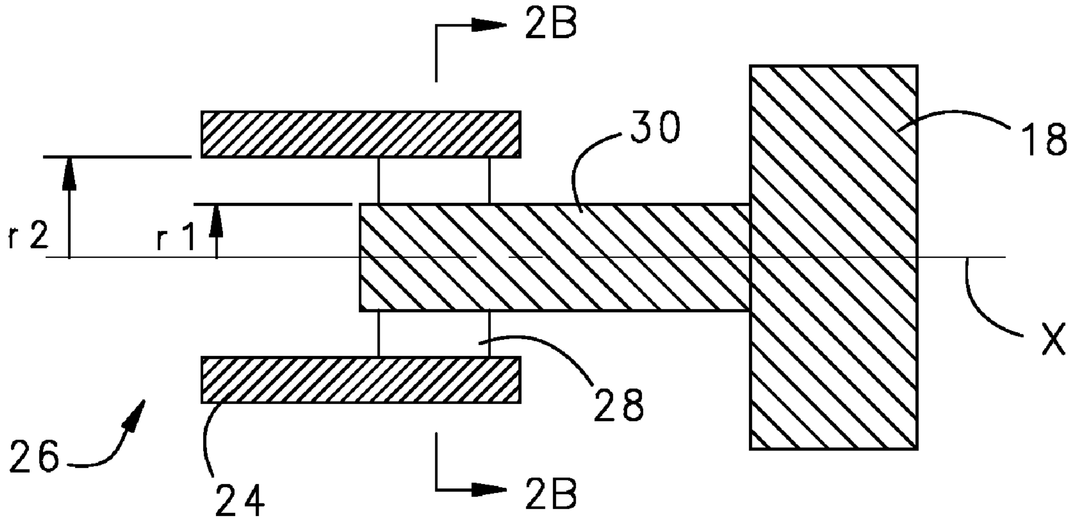
FIG. 2A is a side view of a coupling designed according to the present invention.
Figure 2B:
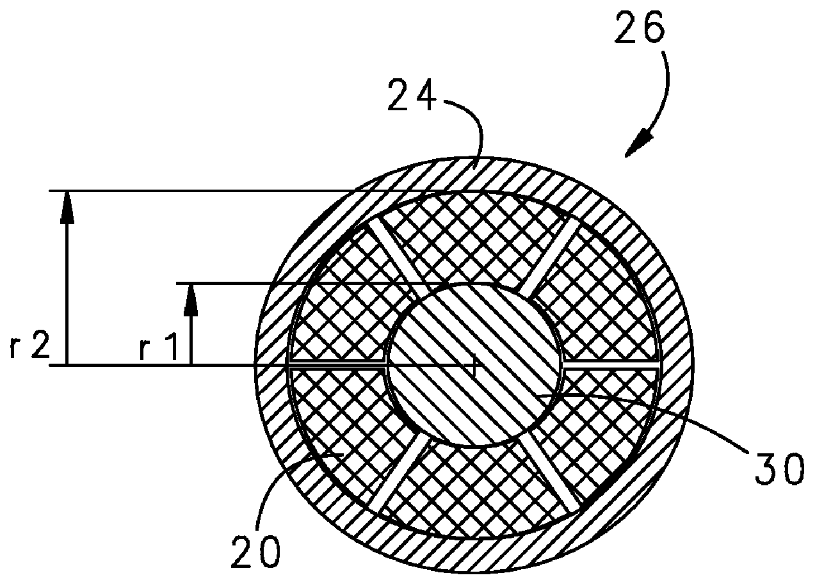
FIG. 2B is a sectional view of the coupling taken along line 3-3 in FIG. 2A.

Referring to FIG. 2A, the shrink-fit coupling 26 includes a discontinuous ring 28 between a stub shaft 30 of the turbine rotor 18 and the rotor shaft 24 (also illustrated in FIG. 2B). The stub shaft 30 defines a radius r1 and coefficient of thermal expansion (CTE) CTE1. The discontinuous ring 28 defines an inner radius r1, outer radius r2 and CTE2. The rotor shaft 24 is tubular and defines an inner radius r2 and CTE3. The outer radius of the rotor shaft 24 is preferably selected such that a suitable compressive stress is created when the ceramic stub shaft 30, the discontinuous ring 28 and the rotor shaft 24 are shrink-fit together preferably at room temperature.

The compressive stress must be maintained for torque transmission during engine operation when component temperatures rise above ambient. Under a uniform temperature rise $\Delta T$, the inner circle of the metal shaft expands by $CTE3*r2*\Delta T$, the ceramic stub shaft expands by $CTE1*r1*\Delta T$, and the discontinuous ring expands by $CTE2*(r2-r1)*\Delta T$. To maintain the compressive stress at elevated temperature, the sum of thermal expansions from the ceramic shaft and the discontinuous ring should match the thermal expansion of the outer ring, $$CTE3\ \Delta T\ r2=CTE2\ \Delta T(r2-r1)+CTE1\ \Delta T r1 \qquad (1)$$

This equation determines the relationship between the shafts, ring dimensions, and their thermal expansion characteristics. For example, if the two radii r1 and r2 are fixed and the materials for the shafts are chosen, then the material for the discontinuous ring should be selected from the CTE2 given by equation (1). Or if the materials for the ceramic stub shaft 30 and the discontinuous ring 28 are pre-determined and the radius of the ceramic stub shaft 30 is also given, then the inner radius r2 of the rotor shaft 24 should be chosen by:

$$r2=(CTE1-CTE2)/(CTE3-CTE2)r1 \qquad (2)$$

Equations (1) and (2) are for an idealized uniform temperature rise. In practice, a gas turbine rotor shaft may exhibit a temperature gradient in the radial direction. For example, the ceramic stub shaft 30 may have a temperature rise $\Delta T1$, while the metallic rotor shaft 24 and the discontinuous ring 28 experience temperature rise of $\Delta T2$ and $\Delta T3$ respectively. To maintain the stress state at the shrink fit coupling, the thermal expansions of the ceramic stub shaft 30 and the discontinuous ring 28 should match that of the rotor shaft 24:

$$CTE3\ \Delta T3\ r2 = CTE2\ \Delta T2\ (r2 - r1) + CTE1\ \Delta T1\ r1 \quad (3)$$

In one example, a shrink-fit coupling includes an SN282 ceramic stub shaft, an IN783 metal shaft and an AISI310 discontinuous ring were modeled. The elastic and thermal expansion properties of these materials are shown in table 1.

TABLE 1

Elastic and thermal expansion properties of the three materials in a shrink-fit coupling

| Material | | E (psi) | v | CTE (1/F) |
|---|---|---|---|---|
| 1 | SN282 | $4.71\ 10^{7}$ | 0.230 | $1.2\ 10^{-6}$ |
| 2 | AISI310 | $2.85\ 10^{7}$ | 0.381 | $8.2\ 10^{-6}$ |
| 3 | IN783 | $2.67\ 10^{7}$ | 0.295 | $5.6\ 10^{-6}$ |

The ceramic and metal shafts were modeled by axisymmetric elements, whereas the discontinuous ring was modeled by plane stress elements to reduce the finite element model size. Surface contact algorithm were employed to simulate the contact between the ceramic shaft and the discontinuous ring, and the contact between the discontinuous ring and the metal shaft. The finite element analysis starts with zero initial stress and is subjected to a uniform temperature rise of 1000 F. Although a non-zero residual stress state could be modeled, this is not necessary to prove the key feature of the present invention-no change in residual stress state during a temperature rise Therefore, an initial stress-free state was assumed.

Finite element analysis was performed on four typical values of the outer radius r1 of the ceramic shaft for a small gas turbine engine. The inner radius of the metal shaft was either selected according to equation (2) that guarantees no change in initial stress state or above and below the value given by equation (2). In the former case, very low stress was observed after the temperature rise of 1000 F (see Table 2). Since the initial stress is zero, this proves that very little change in initial stress state.

TABLE 2

Small change in initial stress if r2 is selected by equation (2)

| | | | | |
|---|---|---|---|---|
| r1 (in) | 1 | 1.5 | 2 | 2.5 |
| r2 (in) | 2.57E+00 | 3.86E+00 | 5.14E+00 | 6.43E+00 |
| Stress (psi) | <1E−6 | <1E−8 | <1E−6 | <1E−7 |

In the cases wherein the inner radius r2 of the rotor shaft 24 is chosen above or below the value given by equation (2), an appreciative stress is introduced or a gap is developed between the shrink-fit parts (see table 3).

TABLE 3

Gap developed or initial stress rose if r2 is below or above that given by equation (2)

| | | | | |
|---|---|---|---|---|
| r1 (in) | | 1 | | 2 |
| r2 (in) | 2.00E+00 | 3.00E+00 | 4.50E+00 | 6.00E+00 |
| Stress (psi) | gap | >−4.7 ksi | gap | >−5.8 ksi |

These numerical results therefore prove that when the inner radius r2 of the metallic rotor shaft 24 is chosen according to equation (2) then no change in initial stress state is expected. Otherwise, either a gap develops and a reduction of initial stress or an increase in initial stress occurs.

Although ceramic and metal shafts have been mentioned in the present invention disclosure, the method proposed applies to any two shafts manufactured of differing materials.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine rotor assembly comprising:

a stub shaft of a turbine rotor manufactured of a ceramic material, said stub shaft defining an outer radius of r1;

an outer rotor shaft manufactured of a metallic material said outer rotor shaft defining an inner radius of r2; and a discontinuous ring between said stub shaft and said outer rotor shaft, where r2 is defined by the equation: r2=(CTE1−CTE2)/(CTE3−CTE2) r1 where:

CTE1 is a coefficent of thermal expansion for the stub shaft;

CTE2 is a coefficent of thermal expansion for the discontinous ring;

CTE3 is a coefficent of thermal expansion for the outer shaft.

2. The gas turbine rotor assembly as recited in claim 1, wherein said outer rotor shaft defines a tubular member.

3. The gas turbine rotor assembly as recited in claim 1, wherein said first material is a ceramic material.

4. The gas turbine rotor assembly as recited in claim 1, wherein said second material is a metallic material.

5. The gas turbine rotor assembly as recited in claim 1, further comprising a compressor rotor mountable to said outer rotor shaft.

6. A method of mounting an inner shaft to an outer rotor shaft, the outer rotor shaft having inner radius r2 which receives the inner shaft having an outer radius of r1 and a discontinuous ring having an inner radius of r1 and outer radius of r2, the discontinuous ring mounted between the inner shaft and the outer rotor shaft, said method comprising the steps of:

(1) determining r2 by the equation: r2=(CTE1−CTE2)/(CTE3−CTE2) r1 where: CTE1 is a coefficent of thermal expansion for the inner shaft; CTE2 is a coefficent of thermal expansion for the discontinuous ring; and CTE3 is a coefficent of thermal expansion for the outer rotor shaft; and (2) shrink fitting the outer rotor shaft and the discontinuous ring to the inner shaft.

7. A method as recited in claim 6, wherein said step (2) occurs at approximately room temperature.

8. A method as recited in claim 6, further comprising the step of:

(3) mounting a compressor rotor over said outer rotor shaft.

9. A gas turbine rotor assembly comprising:

a stub shaft of a turbine rotor manufactured of a ceramic material, said stub shaft defining an outer radius of r1;

a tubular outer rotor shaft manufactured of a metallic material, said outer rotor shaft defining an inner radius of r2;

a compressor rotor mountable to said outer rotor shaft; and a discontinuous ring between said stub shaft and said outer rotor shaft, where r2 is defined by the equation: r2=(CTE1−CTE2)/(CTE3−CTE2) r1 where:

CTE1 is a coefficent of thermal expansion for the stub shaft;

CTE2 is a coefficent of thermal expansion for the discontinous ring;

CTE3 is a coefficent of thermal expansion for the outer shaft.

* * * * *